United States Patent
Stickelmann et al.

(10) Patent No.: US 11,621,650 B2
(45) Date of Patent: Apr. 4, 2023

(54) METHOD FOR CURRENT LIMITATION IN THE EVENT OF TRANSIENT VOLTAGE VARIATIONS AT AN AC OUTPUT OF A MULTI-LEVEL INVERTER AND A MULTI-LEVEL INVERTER

(71) Applicant: SMA Solar Technology AG, Niestetal (DE)

(72) Inventors: Uwe Stickelmann, Kaufungen (DE); Roland Zuelch, Knuellwald (DE)

(73) Assignee: SMA Solar Technology AG, Niestetal (DE)

(*) Notice: Subject to any disclaimer, the term of this patent is extended or adjusted under 35 U.S.C. 154(b) by 44 days.

(21) Appl. No.: 17/411,374

(22) Filed: Aug. 25, 2021

(65) Prior Publication Data

US 2021/0384818 A1 Dec. 9, 2021

Related U.S. Application Data

(63) Continuation of application No. PCT/EP2020/054049, filed on Feb. 17, 2020.

(30) Foreign Application Priority Data

Feb. 28, 2019 (DE) ..................... 10 2019 105 196.7

(51) Int. Cl.
*H02M 7/483* (2007.01)
*H02M 1/32* (2007.01)
(Continued)

(52) U.S. Cl.
CPC ........... *H02M 7/483* (2013.01); *H02M 1/325* (2021.05); *H02M 7/487* (2013.01); *H02M 7/53871* (2013.01)

(58) Field of Classification Search
CPC ...... H02M 7/483; H02M 1/325; H02M 7/487; H02M 7/53871
See application file for complete search history.

(56) References Cited

U.S. PATENT DOCUMENTS 8,730,691 B2* 5/2014 Paatero ................. H02M 7/487
363/131
9,225,262 B2* 12/2015 Aaltio .................. H02H 7/1227
(Continued)

FOREIGN PATENT DOCUMENTS

WO 2018033964 A1 9/2019

OTHER PUBLICATIONS

International Search Report dated May 18, 2020 in connection with PCT/EP2020/054049.

(Continued)

*Primary Examiner* — Adolf D Berhane
(74) *Attorney, Agent, or Firm* — Eschweiler & Potashnik, LLC

(57) ABSTRACT

A method provides current limitation in the event of transient voltage variations at an AC output of a multilevel inverter that includes a bridge circuit with a first DC input, a second DC input, a neutral terminal and a bridge output, as well as a line filter with a choke connected between the bridge output and the AC output, and a capacitor connected between the AC output and the neutral terminal. In the method, depending on the voltage at the capacitor, when a first current threshold is exceeded by the choke current, a regular operating mode is interrupted and measures for current limitation are initiated. A multilevel inverter is further disclosed including a control circuit that is configured to carry out such a method.

12 Claims, 10 Drawing Sheets

(51) Int. Cl.
   *H02M 7/487*     (2007.01)
   *H02M 7/5387*    (2007.01)

(56) References Cited

U.S. PATENT DOCUMENTS

2014/0003103 A1   1/2014  Aaltio
2014/0112039 A1   4/2014  Correa Vasquez
2019/0190403 A1   6/2019  Furukawa

OTHER PUBLICATIONS

Gurpinar Emre et al. "SiC and GaN based BSNPC inverter for photovoltaic systems"; The University of Nottingham; Power Electronics, Machines and Control (PEMC) Group.
Bottrell Nathaniel et al. "Comparison of Current-Limiting Strategies During Fault Ride-Through of Inverters to Prevent Latch-Up and Wind-Up"; IEEE Transactions on Power Electronics; vol. 29; No. 7; Jul. 2014.

* cited by examiner

\# METHOD FOR CURRENT LIMITATION IN THE EVENT OF TRANSIENT VOLTAGE VARIATIONS AT AN AC OUTPUT OF A MULTI-LEVEL INVERTER AND A MULTI-LEVEL INVERTER

CROSS REFERENCE TO RELATED APPLICATIONS

This application is a continuation of International Patent Application number PCT/EP2020/054049, filed on Feb. 17, 2020, which claims priority to German Patent Application number 10 2019 105 196.7, filed on Feb. 28, 2019, and is hereby incorporated by reference in its entirety.

FIELD

The disclosure relates to a method for current limitation in the event of transient voltage variations at an AC output of a multilevel inverter. The disclosure further relates to a multilevel inverter with a control unit that is configured to carry out such a method.

BACKGROUND

Due to normative requirements, inverters in decentralized energy generation systems must not disconnect from the grid when certain grid faults occur, but must be capable of riding through such a grid fault, or even contributing to grid stabilization by the supply of reactive power (FRT—Fault Ride Through). One possible grid fault that must be ridden through is a sudden transient dropout in the grid voltage down to zero percent within a few hundred microseconds up to one or two milliseconds, or also a sudden transient change of a load at the output of the inverter.

In the case of a suddenly occurring transient voltage dropout at the AC output of the inverter, an electrical potential, as in regular operation of the inverter, continues to be present at a bridge output of a bridge circuit of the inverter. A choke of a line filter arranged between the bridge output and the AC output is thereby magnetized by a high voltage difference, which leads to a high current gradient. A regulator of an inverter cannot immediately follow such fast changes at the AC output of the inverter, such that an additional current limitation is necessary to prevent damage to components of the inverter.

It is known and common in the prior art for current limitation in the event of transient voltage variations at an AC output of an inverter to immediately and simultaneously block the drive signals of all the power semiconductor switches of a bridge circuit of the inverter without disconnecting the inverter from the grid from the load, when exceeding a first current threshold value that lies below an absolute current limit, at which the inverter will be switched off and disconnected from the grid or from a load. Regular operation of the inverter is then continued with the next regular drive clock signal, or after falling below the first current threshold value or a second current threshold value that is smaller than the first current threshold value. If the first current threshold value is exceeded again, all of the power semiconductor switches of the bridge circuit are then again switched off by blocking the drive signals, so that a current limitation according to the principle of a two-level controller is achieved.

In the case of multilevel inverters, in particular of multilevel inverters with what is known as NPC topology (neutral point clamped topology), the principle entails that voltage levels that are linked to different potentials at input terminals of the bridge circuit are applied to output terminals of the bridge circuit. As a result, when all the power semiconductor switches of the bridge circuit are driven simultaneously for a transfer into a switched-off state, it can happen that due to different speeds of a transfer of different power semiconductor switches into a switched-off state, in combination with the currents then arising through the freewheeling diodes that are additionally present in the bridge circuit, voltages that are higher than during the regular operation of the inverter are temporarily present at individual power semiconductor switches of the bridge circuit. These higher voltages can in certain circumstances lead to damage to the individual power semiconductor switches of the bridge circuit.

Furthermore, by simply simultaneously switching off all the power semiconductor switches of the bridge circuit, only two different voltage levels of the multiple voltage levels of the multilevel inverter are in fact used, so that existing possibilities for optimized current limitation remain unused.

SUMMARY

The present disclosure is directed to a method for current limitation in the event of transient voltage variations at an AC output of a multilevel inverter and a corresponding inverter, respectively, in which a current limitation that is optimized with regard to a loading of power semiconductor switches of a bridge circuit of the inverter by the smallest possible currents and lowest possible clock frequencies is enabled, and in which the occurrence of higher voltages at the power semiconductor switches than in regular operation of the bridge circuit is prevented.

Two cases are distinguished in a method according to the disclosure for current limitation in the event of transient voltage variations at an AC output of a multilevel inverter, The multilevel inverter comprises a bridge circuit with a first DC input, a second DC input, a neutral terminal and a bridge output, as well as a line filter with a choke connected between the bridge output and the AC output. The multilevel inverter also comprises a capacitor connected between the AC output and the neutral terminal, and is configured to apply selectively an electrical potential present at the first DC input or an electrical potential present at the second DC input, or an electrical potential present at the neutral terminal to the bridge output.

In the case in which, during operation of the inverter in a regular operating mode, the magnitude of the voltage at the capacitor lies above a voltage threshold value, when a first current threshold value is exceeded by the magnitude of the current flowing through the choke, the regular operating mode is interrupted, and the electrical potential that is present at the neutral terminal is applied to the bridge output until the magnitude of the current flowing through the choke falls below a second current threshold value that is smaller than or equal to the first current threshold value.

In the case in which, during operation of the inverter in a regular operating mode, the magnitude of the voltage at the capacitor lies below or at the voltage threshold value, when a first current threshold value is exceeded by the magnitude of the current flowing through the choke, the regular operating mode is likewise interrupted, and the electrical potential at the respective other DC input than the DC input, the electrical potential present at which was most recently applied to the bridge output before the first current threshold value was exceeded, is applied to the bridge output until the magnitude of the current flowing through the choke falls below the second current threshold value that is smaller than or equal to the first current threshold value. This means that if, before the first current threshold value is exceeded, the potential that is present at the first DC input was applied to the bridge output, then after exceeding the first current threshold value, the potential that is present at the second DC input is applied to the bridge output. Accordingly, after the first current threshold value is exceeded, the potential that is present at the first DC input is applied to the bridge output if, before exceeding the first current threshold value, the potential that is present at the second DC input was applied to the bridge output.

The application of different potentials to the bridge output depending on a value of the voltage at the capacitor at the time of exceeding the first current threshold value ensures an optimized setting of the current gradients arising for the decay of the magnitude of the current, when the method for current limitation according to the disclosure is applied. The case in which the magnitude of the voltage at the capacitor lies above a voltage threshold value corresponds to the case of a moderate transient voltage dropout at the AC output, and thus also to a moderate current gradient for a resulting rise in the magnitude of the current. Accordingly, after the first current threshold value has been exceeded by the magnitude of the current flowing through the choke a moderate current gradient for the resulting decay in the magnitude of the current is effected by applying the potential present at the neutral terminal. In contrast, if the electrical potential at the respective other DC input than that before exceeding the first current threshold value is applied or when, in line with the methods according to the prior art, all the power semiconductor switches are switched off, a significantly greater current gradient would result for the decaying magnitude of the current. Setting a lowest possible current gradient for the decaying magnitude of the current ensures a lowest possible clock frequency with which the various potentials are applied at the bridge output in the course of the method for current limitation.

The case in which the magnitude of the voltage at the capacitor lies below or at the voltage threshold value corresponds to the case of a larger transient voltage dropout and to a greater current gradient resulting therefrom for the rise in the magnitude of the current. In this case, when the potential present at the neutral terminal is applied after exceeding the first current threshold value, the magnitude of the current through the choke would continue to rise, which is prevented then by application of the electrical potential at the respective other DC input than the DC input, the electrical potential present at which was most recently applied to the bridge output before the first current threshold value was exceeded.

This was appreciated by the present disclosure to dimension the voltage threshold value in a method according to the disclosure in such a way that, in the event of a transient voltage dropout, for voltages at the capacitor above the voltage threshold value, the magnitude of the current through the choke does not rise after exceeding the first current threshold value when the potential present at the neutral terminal is applied to the bridge output.

The application of the electrical potential to the respective other DC input than that before the current threshold value was exceeded, takes place in the method according to one embodiment of the disclosure in that all of the power semiconductor switches between the corresponding DC input and the bridge output are transferred into a switched-on state by appropriate driving. In the bridge circuits that are used in multilevel inverters, this can, depending on the topology, if necessary, involve multiple power semiconductor switches.

In one embodiment, the dimensioning of the first current threshold value is done in such a way that it lies above the maximum of a current ripple occurring in the regular operating mode of the inverter, and below an absolute current limit which, if reached, leads to the inverter being switched off and being disconnected from the grid or from a load.

The second current threshold value is to be specified in such a way that a good compromise is achieved between the clock frequency with which the various potentials are applied to the bridge output during the method for current limitation and the amplitude of the resulting current ripple during the current limitation. If a second current threshold value that is equal to the first current threshold value is selected, only one current threshold value is in fact present. In this embodiment, it is advantageous to provide additional means for smoothing a measured value of the current through the choke in order to avoid excessively high clock frequencies.

The regular operating mode of the inverter refers to the operating mode for feeding into the grid or into the load when no faults that are to be ridden through are present. In this operating mode, during a first half wave of an AC current that is to be fed, pulse-width modulated pulses with the potential present at the first DC input are applied to the AC output in alternation with the potential present at the neutral terminal, and during a second half wave of the AC current to be fed, pulse-width modulated pulses with the potential present at the second DC input are applied to the AC output in alternation with the potential present at the neutral terminal.

In an embodiment of a method according to the disclosure, the regular operating mode is continued after the magnitude of the current flowing through the choke has fallen below the second current threshold value.

When continuing the regular operating mode, the electrical potential, that is then applied to the bridge output, and the pulse width are set as would have been present at this time without interruption of the regular operating mode, which also means that with a change occurring in the meantime from the first half wave of the AC current to be fed into the second half wave and vice versa, the electrical potential at the respective other DC input than before the first current threshold value was exceeded, is applied to the bridge output.

In case that the transient voltage dropout has not yet ended, the first current threshold value is again exceeded after continuation of the regular operating mode, and the method for current limitation is carried out again, so that an ongoing current limitation according to the principle of a two-level controller is achieved.

In a further embodiment of a method according to the disclosure, in the case in which, with the inverter operating in a regular operating mode, the magnitude of the voltage at the capacitor lies below or at the voltage threshold value, when the first current threshold value is exceeded by the magnitude of the current flowing through the choke, the regular operating mode is interrupted and at first the electrical potential that is present at the neutral terminal is applied to the bridge output. Then the electrical potential at the respective other DC input than the DC input, the electrical potential present at which was most recently applied to the bridge output before the first current threshold value was exceeded, is applied to the bridge output until the magnitude of the current flowing through the choke falls below the second current threshold value that is smaller than or equal to the first current threshold value, and then again the electrical potential that is present at the neutral terminal is at first applied again to the bridge output before the regular operating mode is continued.

Due to the fact that, in this embodiment of a method according to the disclosure, between the application of the potential present at the first DC input to the bridge output and the application of the potential present at the second DC input to the bridge output, as well as between the application of the potential present at the second DC input to the bridge output and the application of the potential present at the first DC input to the bridge output, the potential present at the neutral terminal is applied in each case to the bridge output, a temporary application of voltages that are higher than can occur during regular operation of the bridge circuit to the power semiconductor switches as a result of power semiconductor switches switching at different speeds is avoided. Furthermore, by the interim application of the electrical potential at the neutral terminal to the bridge output, the frequency with which the potential at the bridge output changes between the application of the potential present at the first DC input and the potential present at the second DC input is reduced, and as a consequence, thus also the clock frequency of all the power semiconductor switches, which as a further consequence reduces the stress on the power semiconductor switches.

In a further embodiment of a method according to the disclosure, in the case in which, with the inverter operating in a regular operating mode, the magnitude of the voltage at the capacitor lies below or at the voltage threshold value, when the first current threshold value is first exceeded by the magnitude of the current flowing through the choke, the regular operating mode is interrupted and, as in the embodiment described before, at first the electrical potential that is present at the neutral terminal is applied to the bridge output. Then the electrical potential at the respective other DC input than the DC input, the electrical potential present at which was most recently applied to the bridge output before the first current threshold value was exceeded, is applied to the bridge output until the magnitude of the current flowing through the choke falls below the second current threshold value, and after that the electrical potential that is present at the neutral terminal is applied to the bridge output until the magnitude of the current flowing through the choke again exceeds the first current threshold value. Following this, the electrical potential at the respective other DC input than before the first current threshold value was first exceeded is again applied.

The change between the application of the potential at the respective other DC input than before the first current threshold value was exceeded, and the potential present at the neutral terminal to the bridge output depending on exceeding and falling below the first and second current threshold values is then repeated until the magnitude of the voltage at the capacitor again lies above the voltage threshold value. Only then is the regular operating mode continued.

In this embodiment of a method according to the disclosure, the possibility of an even further reduced clock frequency results, and thus of an even lower stress on the power semiconductor switches. This embodiment furthermore also avoids the unnecessary resumption of the regular operating mode for as long as the magnitude of the voltage at the capacitor lies below or at the voltage threshold value, that means for as long as the transient voltage dropout is still present.

In the embodiment of a method according to the disclosure described before, the regular operating mode can also alternatively be continued if a predetermined time has elapsed since the regular operating mode was interrupted.

The application of the potentials to the bridge output occurs in the method according to the disclosure depending on the current through the choke and the voltage at the capacitor exceeding or falling below threshold values. This current and this voltage are, in one embodiment, measured for this purpose at the choke or at the capacitor. It is also, however, possible for this current and this voltage to be determined from other measured and/or known quantities within the inverter, or to use immediately equivalent measured values in the application of the method. The voltage at the capacitor can, for example, be determined from the measured phase voltage of the grid. In one embodiment, a current can also be determined from a voltage measurement and a voltage can also be determined from a current measurement.

In case that, in an embodiment of a method according to the disclosure, the duration of the application of a potential to the bridge output is not specified by exceeding or falling below a threshold value, it is advantageous to apply the potential to the bridge output at least long enough for transient processes in the currents and potentials within the bridge circuit to be completed. This applies, for example, to the application of the potential present at the neutral terminal to the bridge output for the avoidance of temporarily occurring voltages at the power semiconductor switches that are higher than in regular operation of the bridge circuit as a result of power semiconductor switches that switch at different speeds.

A multilevel inverter according to the disclosure comprises a bridge circuit with a first DC input, a second DC input, a neutral terminal and a bridge output, as well as a line filter with a choke connected between the bridge output and the AC output, and a capacitor connected between the AC output and the neutral terminal. A multilevel inverter according to the disclosure further comprises a control unit that is configured to carry out a method according to the disclosure.

The bridge circuit of a multilevel inverter according to the disclosure can be a diode-clamped NPC (neutral point clamped) bridge circuit. Such a bridge circuit is also known under the alternative names of a standard NPC, NPC type I or INPC.

In a further embodiment of a multilevel inverter according to the disclosure, the bridge circuit can be a BSNPC bridge circuit (bidirectional switch neutral point clamped bridge circuit). Such a bridge circuit is also known under the alternative names of NPC type II or TNPC.

In a further embodiment of a multilevel inverter according to the disclosure the bridge circuit can be an ANPC (active neutral point clamped) bridge circuit.

The power semiconductor switches of the bridge circuit of a multilevel inverter according to the disclosure can be implemented as field-effect transistors, for example as SiC MOSFETs or as bipolar transistors, for example as IGBTs in silicon technology. In one embodiment, it is possible for only some individual power semiconductor switches of the bridge circuit to be implemented as field-effect transistors, and for the respective other power semiconductor switches of the bridge circuit to be bipolar transistors. This enables an optimized selection of the power semiconductor switches from the point of view of switching times, as well as switching and conduction losses.

A multilevel inverter according to the disclosure can be a single-phase inverter in which, for example, two bridge circuits can also be clocked with offset, or it can, for example, also be a three-phase inverter in which a three-phase bridge circuit comprises at least three bridge circuits with offset clocks.

In a multilevel inverter according to one embodiment of the disclosure that comprises more than one bridge circuit, a current limitation according to a method according to the disclosure can be carried out for each bridge circuit individually, independently of the other bridge circuits. Alternatively, an identical current limitation can be carried out in all the bridge circuits depending on the respective largest current through the respective choke, and the respective lowest voltage at the respective capacitor of all the line filters arranged between the respective bridge output and the respective AC output.

BRIEF DESCRIPTION OF THE DRAWINGS

The disclosure is explained in more detail below with reference to figures. The figures here have the purpose of illustrating embodiments of the disclosure, and do not restrict the disclosure to the features shown.

DETAILED DESCRIPTION

Figure 1:
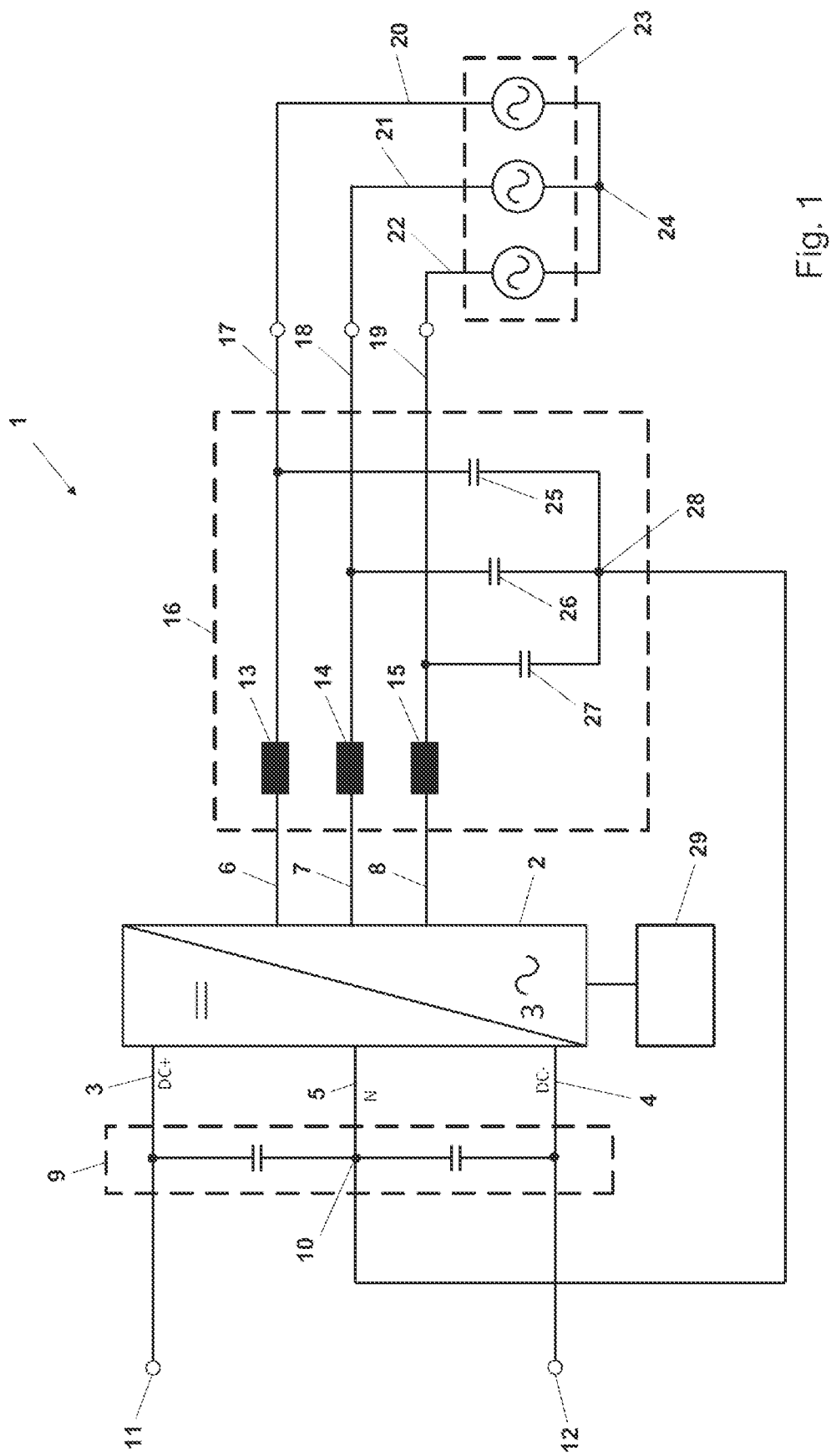
FIG. 1 shows an inverter according to the disclosure.

An inverter 1 according to the disclosure is illustrated in one embodiment in FIG. 1 as a three-phase inverter. The inverter comprises a three-phase bridge circuit 2 with a first DC input 3, a second DC input 4, a neutral terminal 5 and three bridge outputs 6, 7, 8. A split DC link circuit 9, the center point 10 of which is connected to the neutral terminal 5, is connected between the first DC input 3 and the second DC input 4. The first DC input 3 is furthermore connected to a first DC terminal 11 of the inverter 1, and the second DC input 4 to a second DC terminal 12 of the inverter 1.

The bridge outputs 6, 7, 8 are each connected to AC outputs 17, 18, 19 of the inverter 1 through chokes 13, 14, 15 of a line filter 16. One of three phase conductors 20, 21, 22 of a grid 23 is connected to each of the AC outputs 17, 18, 19. A capacitor 25, 26, 27 of the line filter 16 is furthermore connected to each of the AC outputs 17, 18, 19, while the other ends of the capacitors 25, 26, 27 are connected to a common neutral point 28 that is in turn connected to the neutral terminal 5 of the bridge circuit 2. In another embodiment of an inverter according to the disclosure, a star point 24 of the grid 23 can also be connected to the neutral point 28, and thus also to the neutral terminal 5 of the bridge circuit 2.

An inverter 1 according to the disclosure further comprises a control unit or circuit 29 that is configured to drive the bridge circuit 2 in such a way that selectively an electrical potential present at the first DC input 3, in this case for example a positive potential DC+, or an electrical potential present at the second DC input 4, in this case for example a negative potential DC−, or an electrical potential present at the neutral terminal 5, in this case for example a neutral potential N, is applied to the bridge outputs 6, 7, 8. The control unit 29 uses drive signals to drive power semiconductor switches that are contained in the bridge circuit 2 to transfer into a switched-on or switched-off state. The control unit 29 is, in one embodiment, configured to carry out a method according to the disclosure in order to effect a current limitation in the presence of transient voltage variations at the AC outputs 17, 18, 19.

Figure 2:
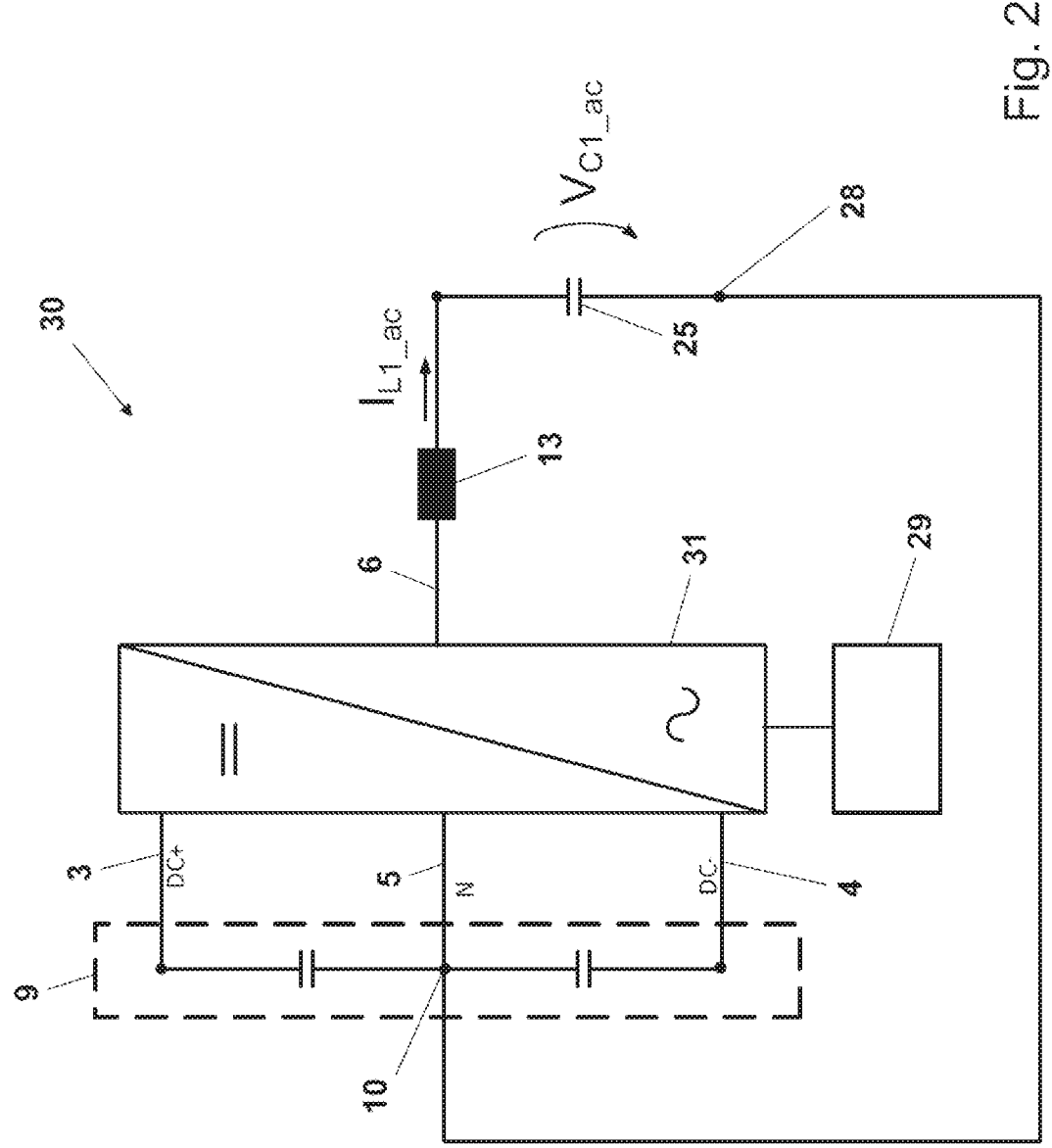
FIG. 2 shows a phase branch of an inverter according to the disclosure.

FIG. 2 shows a phase branch 30 of an inverter according to the disclosure with a single-phase bridge circuit 31. In a three-phase inverter 1 according to FIG. 1, at least three such single-phase bridge circuits 31 are arranged inside the three-phase bridge circuit 2, wherein the first DC input 3 is connected to all the single-phase bridge circuits 31, the second DC input 14 is connected to all the single-phase bridge circuits 31, and the neutral terminals 5 of all the single-phase bridge circuits 31 are connected together. A single-phase inverter comprises at least one phase branch 30 with a single-phase bridge circuit 31.

The control unit 29 captures or monitors the current IL1_ac through the choke 13 and the voltage VC1_ac at the capacitor 25 in order to effect, depending on these values, a current limitation according to the method according to the disclosure.

Figure 3:
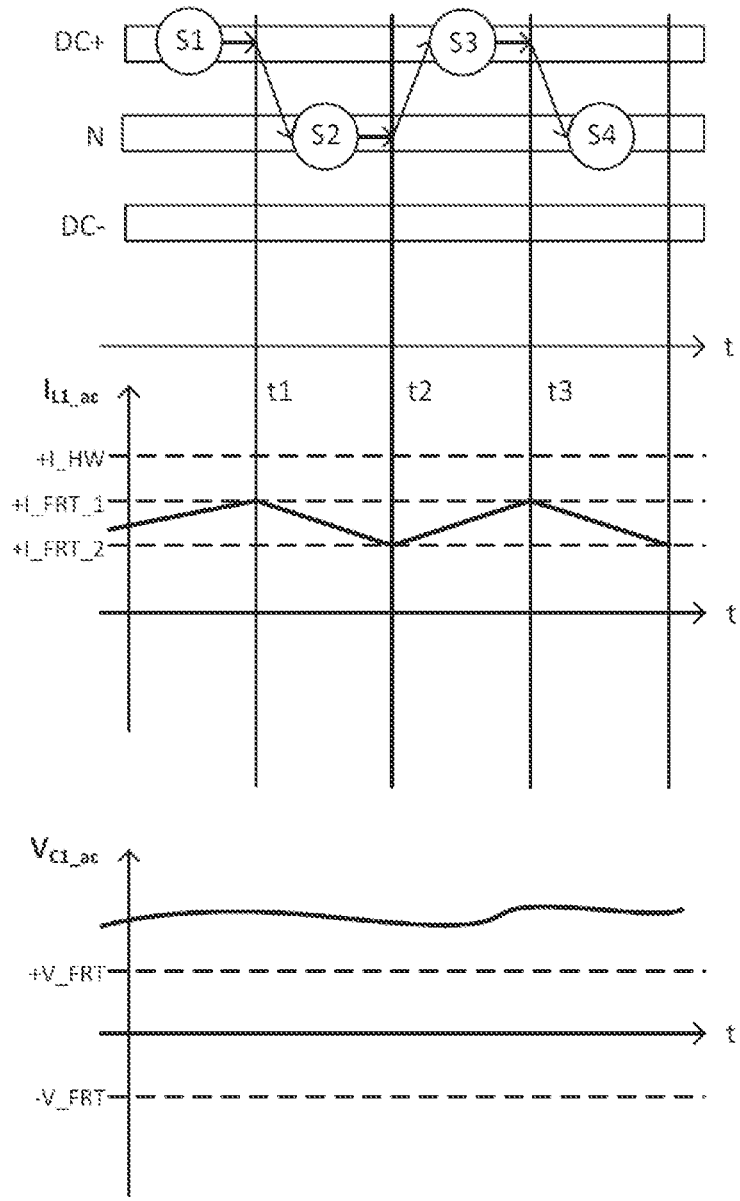
FIG. 3 shows a temporal sequence in a method according to the disclosure in a first case.

An example of a temporal sequence in a method according to the disclosure in the case in which a transient voltage dropout of the grid is present, and the magnitude of the voltage VC1_ac lies above a voltage threshold value V_FRT is illustrated in FIG. 3. In act S1 the inverter is operated in a regular operating mode, wherein a potential DC+ is present at the bridge output. The transient voltage dropout of the grid that occurs causes a rise in the magnitude of the current IL1_ac. At a time t1 the magnitude of the current IL1_ac exceeds a first current threshold value I_FRT_1, which lies underneath an absolute current limit I_HW, on reaching of which the inverter is switched off and is disconnected from the grid or from a load. As a result of the first current threshold value I_FRT_1 being exceeded by the magnitude of the current IL1_ac at time t1, the regular operating mode is interrupted, and the potential N is applied to the bridge output in act S2, whereby the magnitude of the current IL1_ac begins to fall. The potential N is applied to the bridge output until the magnitude of the current IL1_ac falls below a second current threshold value I_FRT_2 at a time t2. The regular operating mode is then continued in act S3, wherein the potential that would have been present even without interruption of the regular operating mode at time t2, the potential DC+ in the present case, is applied to the bridge output.

Due to the transient voltage dropout still being present, the magnitude of the current IL1_ac then rises again, and at time t3 again exceeds the first current threshold value I_FRT_1, whereupon, in act S4, the potential N is again applied to the bridge output until the magnitude of the current again lies below the second current threshold value I_FRT_2. In this way, a current limitation according to the principle of a two-level controller is effected by a method according to the disclosure, for as long as the transient voltage dropout remains and the magnitude of the current IL1_ac always rises again as a result after a continuation of the regular operating mode.

Figure 4:
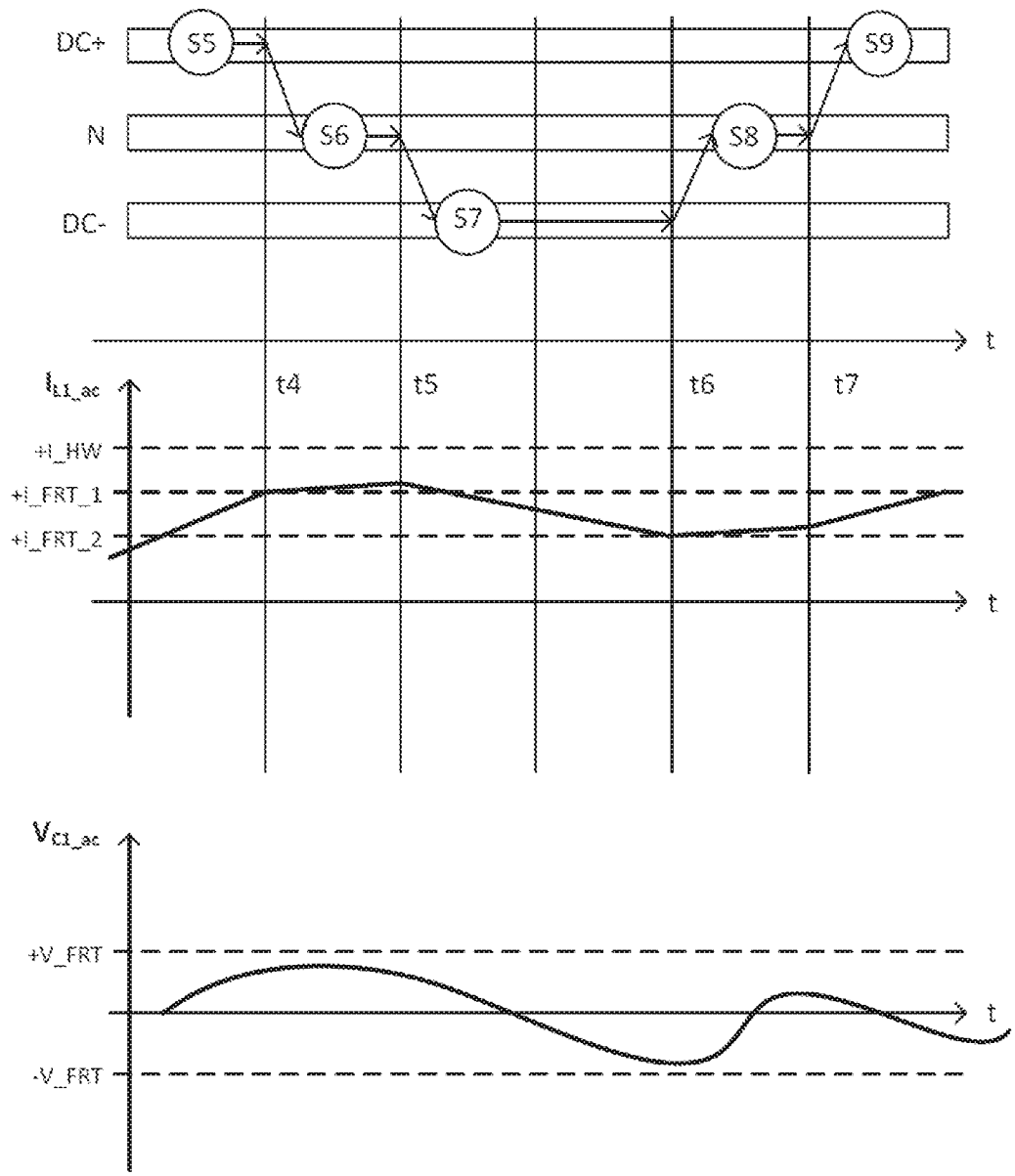
FIG. 4 shows a temporal sequence in a method according to the disclosure in a second case.

An example of a temporal sequence in a method according to the disclosure in the case in which a transient voltage dropout of the grid is present, and the magnitude of the voltage VC1_ac lies below or at the voltage threshold value V_FRT, is illustrated in FIG. 4. In act S5 the inverter is operated in a regular operating mode, wherein a potential DC+ is present at the bridge output. The transient voltage dropout of the grid causes a rise in the magnitude of the current IL1_ac. At a time t4 the magnitude of the current IL1_ac exceeds the first current threshold value I_FRT_1. The regular operating mode is thereupon interrupted, and at first the potential N is applied in act S6 to the bridge output, whereupon the magnitude of the current IL1_ac continues to rise still further. In act S7 at a time t5 the potential DC– is applied to the bridge output, whereby the magnitude of the current IL1_ac falls again. The potential DC– is applied to the bridge output until the magnitude of the current IL1_ac falls below the second current threshold value I_FRT_2 at a time t6. In act S8 the potential N is then at first applied again to the bridge output, and, at a time t7, the regular operating mode is then continued in act S9, wherein the potential that would have been present even without interruption of the regular operating mode at time t7, the potential DC+ in the present case, is applied to the bridge output Due to the transient voltage dropout still being present, the magnitude of the current IL1_ac then rises again, so that by repetition of the acts illustrated in FIG. 4 a current limitation according to the principle of a two-level controller is effected by the method according to the disclosure, for as long as the transient voltage dropout continues.

Figure 5:
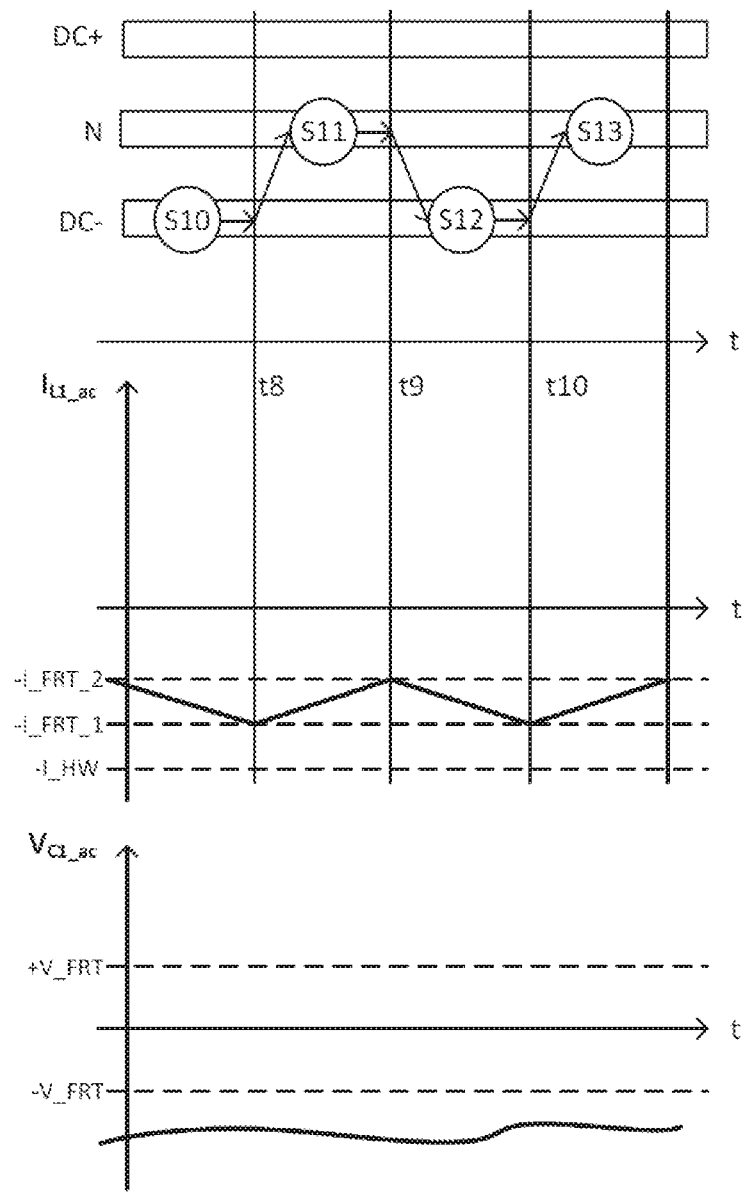
FIG. 5 shows a temporal sequence in a method according to the disclosure in a third case.

FIG. 5 shows a further example of a temporal sequence in a method according to the disclosure in the case in which a transient voltage dropout of the grid is present, and the magnitude of the voltage VC1_ac (i.e., the absolute value) lies above the voltage threshold value V_FRT. In contrast to FIG. 3, a negative voltage VC1_ac, the magnitude of which lies above the voltage threshold value V_FRT is present here (i.e., the voltage is below the negative threshold value –V_FRT). In act S10 the inverter is operated in a regular operating mode, wherein, in contrast to FIG. 3, a negative potential DC– is present at the bridge output. The current IL1_ac is also negative. If the magnitudes of the current IL1_ac are considered, the sequence of the method does not differ in principle from that of FIG. 3. When the first current threshold value I_FRT_1 is exceeded by the magnitude of the current IL1_ac at time t8, the regular operating mode is interrupted, and the potential N is applied to the bridge output in act S11, whereby the magnitude of the current IL1_ac falls again. The potential N is applied to the bridge output until the magnitude of the current IL1_ac falls below the second current threshold value I_FRT_2 at a time t9. The regular operating mode is then continued in act S12, and, as the first current threshold value I_FRT_1 is again exceeded by the magnitude of the current IL1_ac at time t10, the potential N is again applied to the bridge output in act S13. By performing these acts repeatedly, a current limitation according to the principle of a two-level controller is effected for as long as the transient voltage dropout continues.

Figure 6:
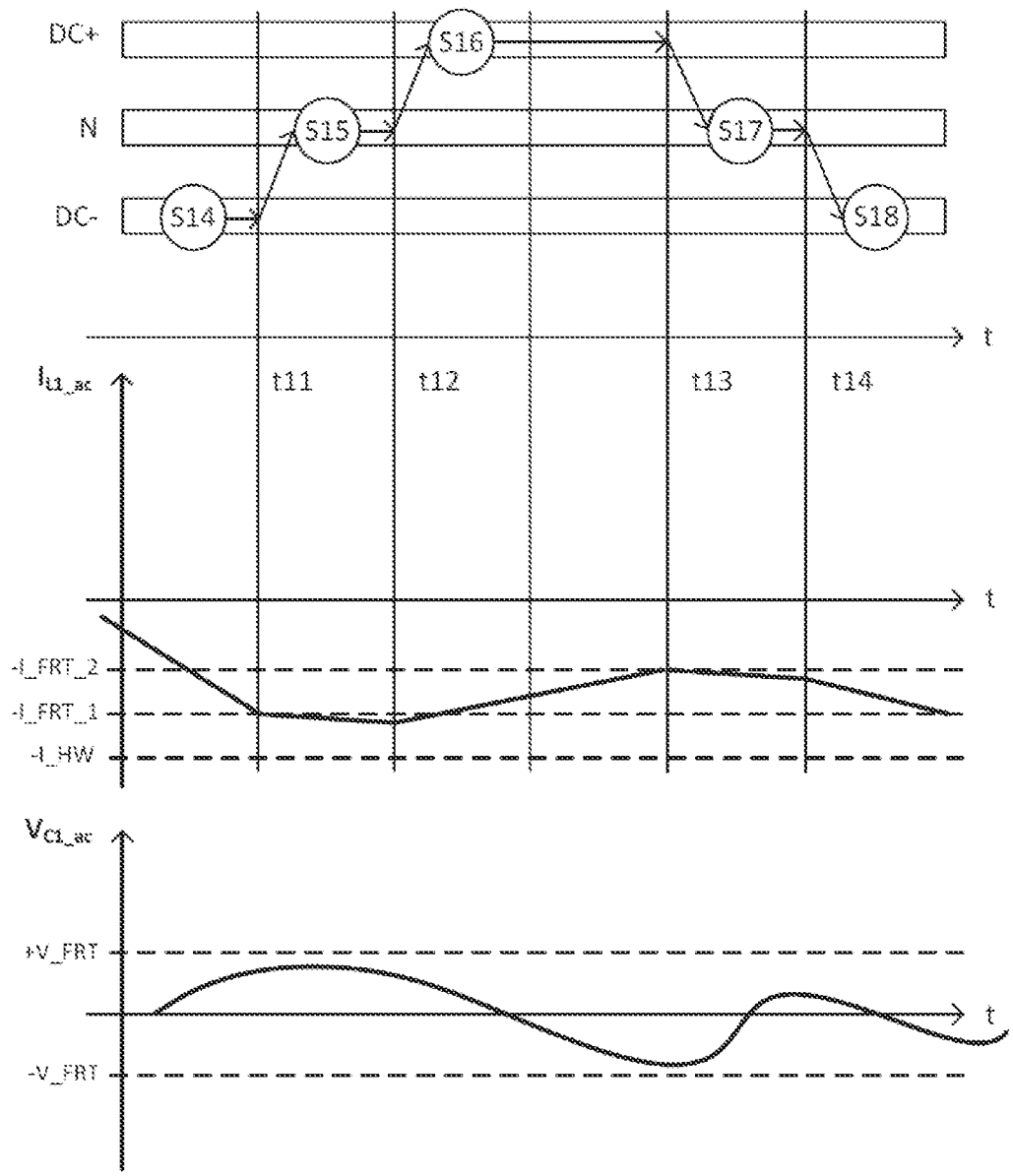
FIG. 6 shows a temporal sequence in a method according to the disclosure in a fourth case.

The example of a temporal sequence in a method according to the disclosure in FIG. 6 again relates to the case in which a transient voltage dropout of the grid is present, and the magnitude of the voltage VC1_ac lies below or at a voltage threshold value V_FRT. In contrast to the example of FIG. 4, the inverter here is operated in act S14 in a regular operating mode, with, in contrast to FIG. 4, a negative potential DC– at the bridge output. Furthermore, the current IL1_ac is negative here. If the magnitudes of the current IL1_ac are considered, the sequence of the method does not differ in principle from that of FIG. 4. At a time t11 the magnitude of the current IL1_ac exceeds the first current threshold value I_FRT_1. The regular operating mode is thereupon interrupted, wherein at first the potential N is applied to the bridge output in act S15 and then, at a time t12 in act S16, the potential DC+ is applied to the bridge output until the magnitude of the current IL1_ac falls below the second current threshold value I_FRT_2 at a time t13. In act S17 the potential N is again at first applied to the bridge output, and the regular operating mode is continued in act S18 at a time t14. By repeating the acts illustrated in FIG. 6 using the method according to the disclosure, a current limitation according to the principle of a two-level controller is effected for as long as the transient voltage dropout continues.

Figure 7:
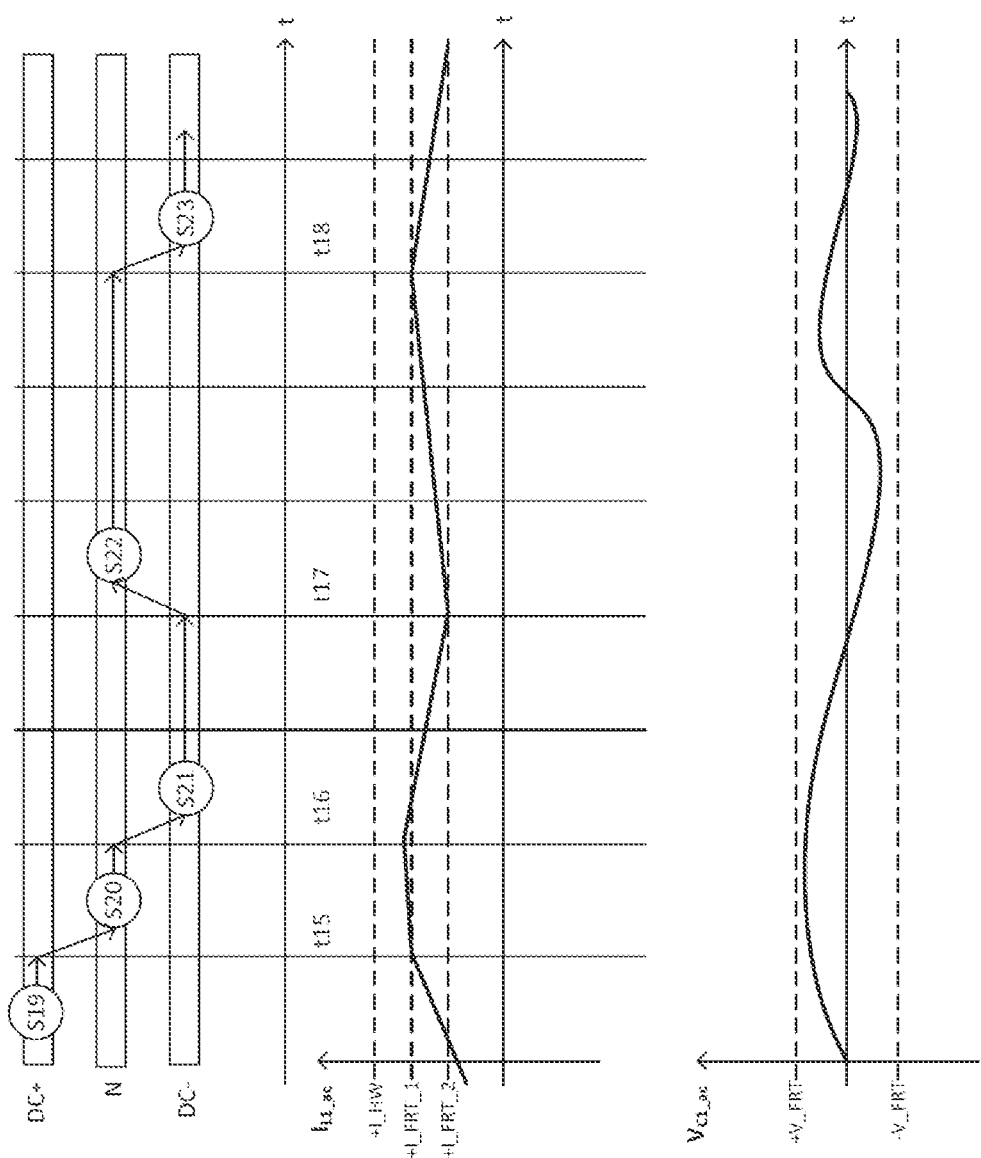
FIG. 7 shows a temporal sequence in a further embodiment of a method according to the disclosure.

An example of a temporal sequence in a further embodiment of a method according to the disclosure, again relating to the case in which a transient voltage dropout of the grid is present, and the magnitude of the voltage VC1_ac lies below or at the voltage threshold value V_FRT is illustrated in FIG. 7. The sequence with acts S19, S20 and S21 at the times t15 and t16 is the same as the sequence with the acts S5, S6 and S7 at the times t4 and t5 in the exemplary embodiment illustrated in FIG. 4. When the magnitude of the current IL1_ac falls below the second current threshold value I_FRT_2 at a time t17 the potential N is then applied in act S22 to the bridge output, and this is done until the magnitude of the current IL1_ac again exceeds the first current threshold value I_FRT_1 at a time t18. In a next act S23 the potential DC– is then, analogously to act S21, applied to the bridge output, whereupon the magnitude of the current IL1_ac falls again.

By the repeated alternating application of the potentials DC– and N for as long as the current respectively falls below the current threshold value I_FRT_2 or the first current threshold value I_FRT_1 is exceeded, a current limitation according to the principle of a two-level controller is effected with this embodiment of a method according to the disclosure. Only when the magnitude of the voltage VC1_ac again lies above the voltage threshold value V_FRT is the regular operating mode continued and then, either the current is, for example, further limited according to the method according to the disclosure as illustrated in the example of FIG. 4 if a transient voltage dropout still continues, or the current limitation is ended.

The embodiment of FIG. 7 concerns the case in which the potential DC+ is present at the bridge output before the first current threshold value I_FRT_1 is first exceeded, and a positive current IL1_ac is present. In the case in which the potential DC– is present at the bridge output before the first current threshold value I_FRT_1 is first exceeded, and a negative current IL1_ac is present, a further embodiment of a method according to the disclosure with, in principle, the same sequence results if the magnitudes of the current IL1_ac are considered.

Figure 8:
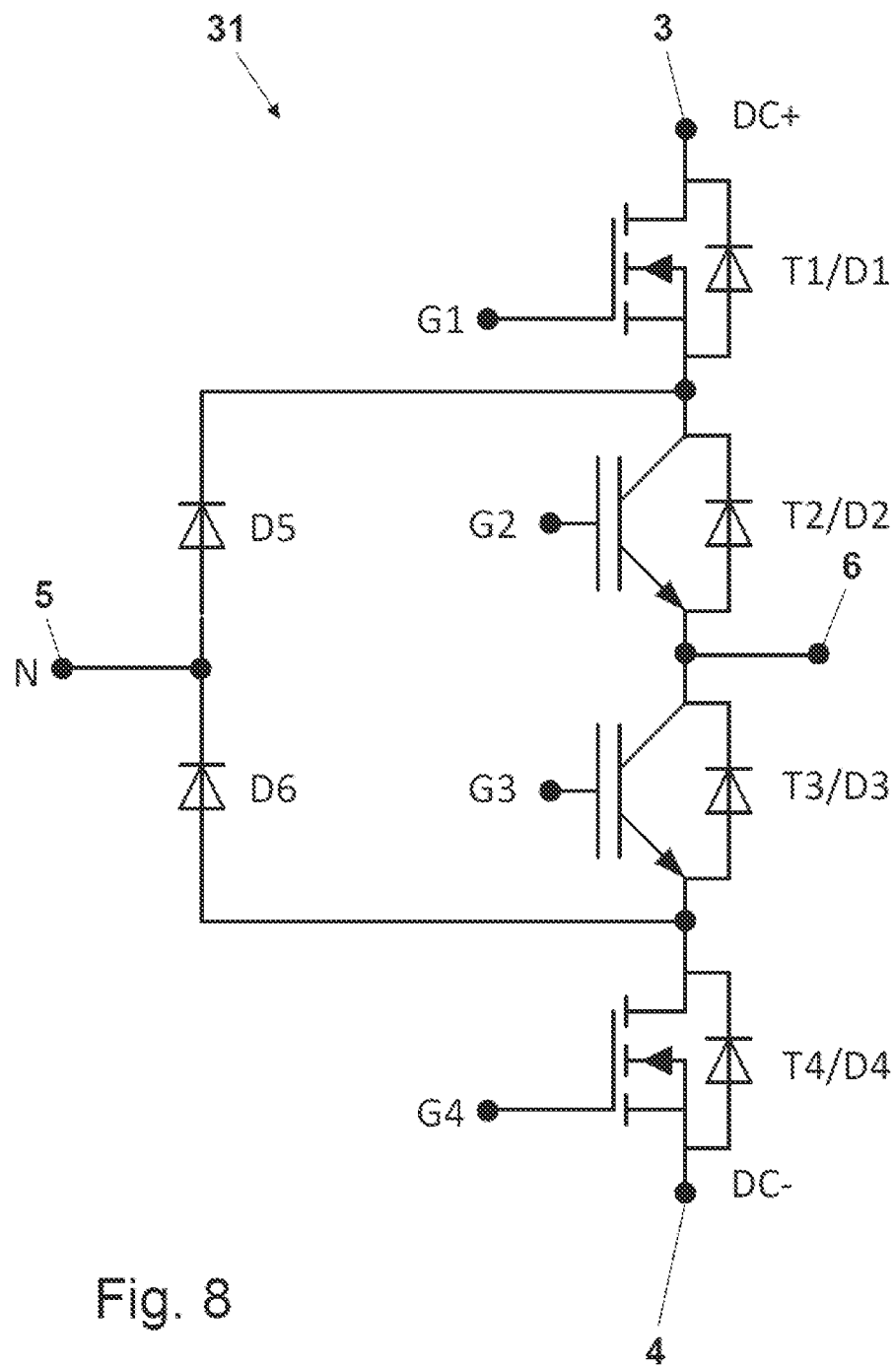
FIG. 8 shows a bridge circuit of an inverter according to the disclosure in an embodiment as a diode-clamped NPC bridge circuit.

An embodiment of a bridge circuit 31 of an inverter according to the disclosure as a diode-clamped NPC bridge circuit is illustrated in FIG. 8. In this bridge circuit 31, the first DC input 3 is connected to the second DC input 4 of the bridge circuit 31 via a series circuit of a first power semiconductor switch T1, a second semiconductor switch T2, a third power semiconductor switch T3 and a fourth power semiconductor switch D4. An antiparallel diode D1 to D4 is arranged with each of the power semiconductor switches T1 to T4, each of which allows a flow of current opposite to the current flow direction that is possible when the respective power semiconductor switch T1 to T4 is in the switched-on state.

The neutral terminal 5 is connected via a fifth diode D5 to a connecting point between the first power semiconductor switch T1 and the second power semiconductor switch T2. A connecting point between the third power semiconductor switch T3 and the fourth power semiconductor switch T4 is connected via a diode D6 to the neutral terminal 5. A connecting point between the second power semiconductor switch T2 and the third power semiconductor switch T3 forms the bridge output 6.

The power semiconductor switches T1 to T4 can be controlled to transfer into a switched-on or switched-off state by drive signals G1 to G4. By an appropriate control, the electrical potential DC+ present at the first DC input 3, or the electrical potential DC− present at the second DC input 4, or the electrical potential N present at the neutral terminal 5 can then selectively be applied to the bridge output 6.

In the embodiment of the bridge circuit 31 in FIG. 8, the power semiconductor switches T1 and T4 are, for example, embodied as field-effect transistors, for example as SiC MOSFETs, and the power semiconductor switches T2 and T3 are embodied as bipolar transistors, for example as IGBTs in silicon technology. Other combinations of power semiconductor technologies are also possible.

Figure 9:
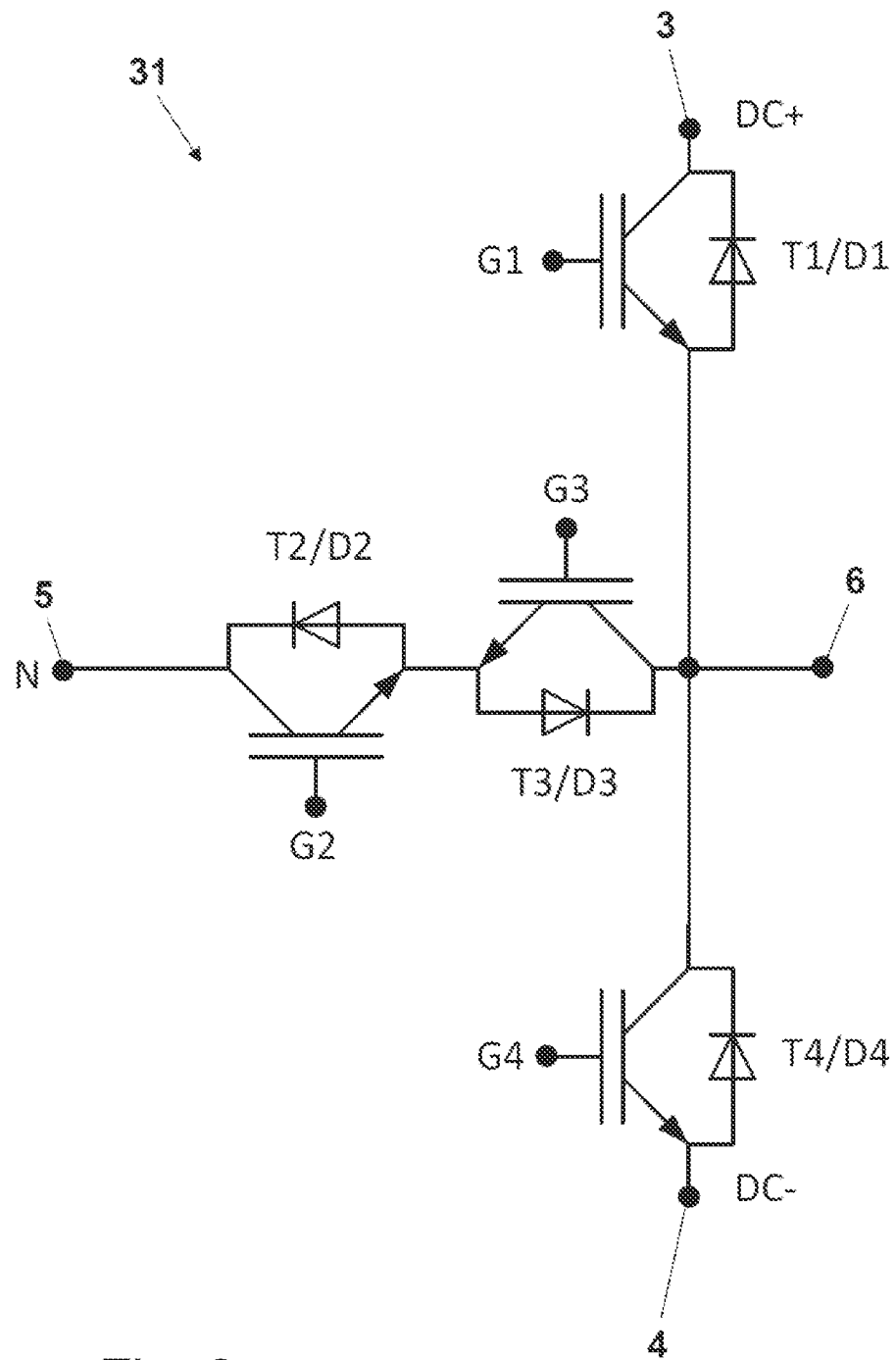
FIG. 9 shows a bridge circuit of an inverter according to the disclosure in an embodiment as a BSNPC bridge circuit.

An embodiment of a bridge circuit 31 of an inverter according to the disclosure as a BSNPC bridge circuit is illustrated in FIG. 9. The first DC input 3 is connected here to the second DC input 4 of the bridge circuit 31 via a series circuit of a first power semiconductor switch T1 and a fourth power semiconductor switch T4, while a connecting point between the first power semiconductor switch T1 and the fourth power semiconductor switch T4 forms the bridge output 6. An antiparallel diode D1 or D4 is arranged with each of the power semiconductor switches T1 and T4, each of which allows a flow of current opposite to the current flow direction that is possible when the power semiconductor switch T1 or T4 is in the switched-on state. A series circuit of two power semiconductor switches T2 and T3, with opposite current flow directions and in each case diodes D2 and D3 respectively connected antiparallel with each of the power semiconductor switches, is arranged between the connecting point between the first power semiconductor switch T1 and the fourth power semiconductor switch T4 and the neutral terminal 5. The arrangement of the power semiconductor switches T2 and T3 in connection with the diodes D2 and D3 forms a bidirectional switch.

The power semiconductor switches T1 to T4 can be controlled to transfer into a switched-on or switched-off state by drive signals G1 to G4. By an appropriate control, the electrical potential DC+ present at the first DC input 3, or the electrical potential DC− present at the second DC input 4, or the electrical potential N present at the neutral terminal 5 can then selectively be applied to the bridge output 6.

In the embodiment of the bridge circuit 31 in FIG. 9, all the power semiconductor switches are, for example, embodied as bipolar transistors, for example as IGBTs in silicon technology. Other power semiconductor technologies or combinations of different power semiconductor technologies are also possible.

Figure 10:
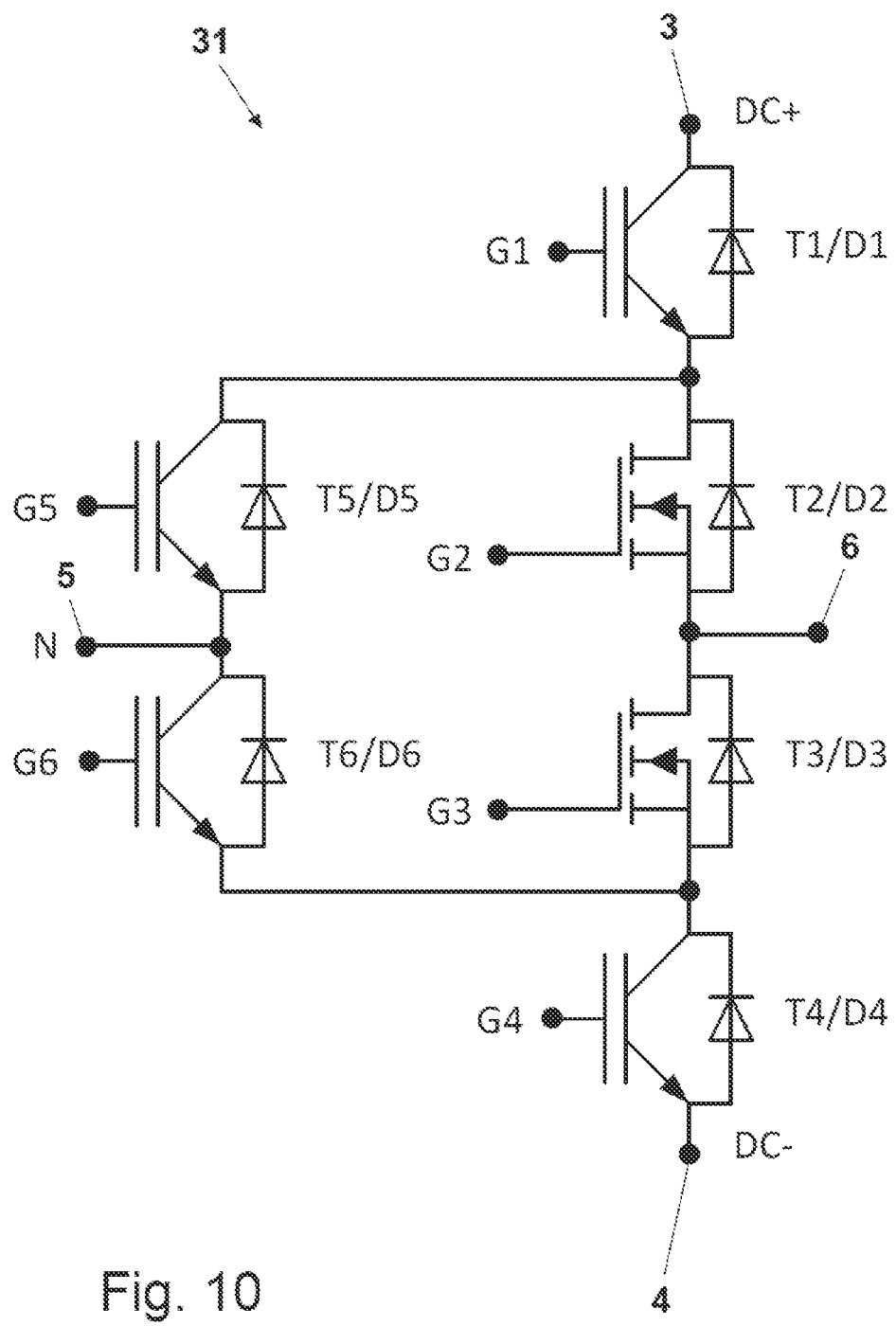
FIG. 10 shows a bridge circuit of an inverter according to the disclosure in an embodiment as an ANPC bridge circuit.

Still a further embodiment of a bridge circuit 31 of an inverter according to the disclosure as an ANPC bridge circuit is shown in FIG. 10. In contrast to the NPC bridge circuit of FIG. 8, a fifth and a sixth power semiconductor switch T5 and T6 respectively are additionally connected antiparallel to the fifth and sixth diode D5 and D6.

The power semiconductor switches T1 to T6 can be controlled to transfer into a switched-on or switched-off state by drive signals G1 to G6. By an appropriate control, the electrical potential DC+ present at the first DC input 3, or the electrical potential DC− present at the second DC input 4, or the electrical potential N present at the neutral terminal 5 can then selectively be applied to the bridge output 6.

In the embodiment of the bridge circuit 31 in FIG. 10, the power semiconductor switches T2 and T3 are, for example, embodied as field-effect transistors, for example as SiC MOSFETs, and the power semiconductor switches T1, T4, T5 and T6 are embodied as bipolar transistors, for example as IGBTs in silicon technology. Other combinations of power semiconductor technologies are also possible.

The disclosure is not restricted to the embodiments that are shown explicitly, but can be modified in a versatile manner, in particular combined with other embodiments that are shown or known to a person skilled in the art.

The invention claimed is:

1. A method for current limitation in an event of transient voltage variations at an AC output of a multilevel inverter that comprises a bridge circuit with a first DC input, a second DC input, a neutral terminal and a bridge output, as well as a line filter with a choke connected between the bridge output and the AC output, and a capacitor connected between the AC output and the neutral terminal, and is configured to apply selectively an electrical potential present at the first DC input or an electrical potential present at the second DC input, or an electrical potential present at the neutral terminal to the bridge output, comprising:

during operation of the multilevel inverter in a regular operating mode, when a magnitude of a voltage at the capacitor exceeds a voltage threshold value, when a first current threshold value is exceeded by a magnitude of a current flowing through the choke, interrupting the regular operating mode, and applying an electrical potential that is present at the neutral terminal to the bridge output until the magnitude of the current flowing through the choke falls below a second current threshold value that is smaller than or equal to the first current threshold value, and during operation of the multilevel inverter in the regular operating mode, when the magnitude of the voltage at the capacitor is below or is equal to the voltage threshold value, when the first current threshold value is exceeded by the magnitude of the current flowing through the choke, interrupting the regular operating mode, and applying an electrical potential at a respective other DC input than a DC input the electrical potential present at which was most recently applied to the bridge output before the first current threshold value was exceeded to the bridge output until the magnitude of the current flowing through the choke falls below the second current threshold value that is smaller than or equal to the first current threshold value.

2. The method as claimed in claim 1, further comprising continuing the regular operating mode after the magnitude of the current flowing through the choke falls below the second current threshold value, which is smaller than or equal to the first current threshold value.

3. The method as claimed in claim 2, wherein during operation of the multilevel inverter in the regular operating mode, and a voltage magnitude at the capacitor is less than or equal to the voltage threshold value, interrupting the regular operating mode when the magnitude of the current flowing through the choke exceeds the first current threshold value, and
 initially applying the electrical potential present at the neutral terminal to the bridge output,
 then applying the electrical potential present at the respective other DC input than the DC input the electrical potential present at which was most recently applied to the bridge output before the first current threshold value was exceeded, to the bridge output until the magnitude of the current flowing through the choke falls below the second current threshold value,
 then applying the electrical potential present at the neutral terminal is at first applied to the bridge output before the regular operating mode is continued.

4. The method as claimed in claim 1, wherein during operation of the multilevel inverter in the regular operating mode, and a voltage magnitude at the capacitor is less than or equal to the voltage threshold value, interrupting the regular operating mode when the magnitude of the current flowing through the choke exceeds the first current threshold value for a first time, and
 Initially applying the electrical potential present at the neutral terminal to the bridge output,
 then repeatedly applying the electrical potential present at the respective other DC input than the DC input the electrical potential present at which was most recently applied to the bridge output before the first current threshold value was exceeded for the first time to the bridge output until the magnitude of the current flowing through the choke falls below the second current threshold value, and after that applying the electrical potential at the neutral terminal is applied to the bridge output until the magnitude of the current flowing through the choke again exceeds the first current threshold value.

5. The method as claimed in claim 4, further comprising continuing the regular operating mode when the magnitude of the voltage at the capacitor exceeds the voltage threshold value.

6. The method as claimed in claim 4, further comprising continuing the regular operating mode if a predetermined time has elapsed since an interruption of the regular operating mode.

7. A multilevel inverter comprising a bridge circuit with a first DC input, a second DC input, a neutral terminal, and a bridge output as well as a line filter with a choke connected between the bridge output and an AC output, a capacitor connected between the AC output and the neutral terminal, and a control circuit configured to:
 during operation of the multilevel inverter in a regular operating mode, when a magnitude of a voltage at the capacitor exceeds a voltage threshold value, when a first current threshold value is exceeded by a magnitude of a current flowing through the choke, interrupting the regular operating mode, and applying an electrical potential that is present at the neutral terminal to the bridge output until the magnitude of the current flowing through the choke falls below a second current threshold value that is less than or equal to the first current threshold value, and
 during operation of the multilevel inverter in the regular operating mode, when the magnitude of the voltage at the capacitor is less than or is equal to the voltage threshold value, when the first current threshold value is exceeded by the magnitude of the current flowing through the choke, interrupting the regular operating mode, and applying an electrical potential at a respective other DC input than the DC input the electrical potential present at which was most recently applied to the bridge output before the first current threshold value was exceeded to the bridge output until the magnitude of the current flowing through the choke falls below the second current threshold value that is less than or equal to the first current threshold value.

8. The multilevel inverter as claimed in claim 7, wherein the bridge circuit comprises a diode-clamped neutral point clamped (NPC) bridge circuit.

9. The multilevel inverter as claimed in claim 7, wherein the bridge circuit comprises a bidirectional switch neutral point clamped (BSNPC) bridge circuit.

10. The multilevel inverter as claimed in claim 7, wherein the bridge circuit comprises an active neutral point clamped (ANPC) bridge circuit.

11. The multilevel inverter as claimed in claim 7, wherein the multilevel inverter comprises a single-phase inverter that comprises at least one bridge circuit.

12. The multilevel inverter as claimed in claim 7, wherein the multilevel inverter comprises a three-phase inverter that comprises at least three bridge circuits.

* * * * *